United States Patent
Niranjan et al.

(10) Patent No.: US 10,027,721 B2
(45) Date of Patent: Jul. 17, 2018

(54) MULTI-ENDPOINT DESIGN FOR EPDG SUPPORTED DEVICES

(71) Applicant: Samsung Electronics Co., Ltd., Suwon-si (KR)

(72) Inventors: Niranjan, Mountain View, CA (US); Shu Wang, Mountain View, CA (US)

(73) Assignee: Samsung Electronics Co., Ltd., Suwon-Si (KR)

(*) Notice: Subject to any disclaimer, the term of this patent is extended or adjusted under 35 U.S.C. 154(b) by 151 days.

(21) Appl. No.: 15/091,480

(22) Filed: Apr. 5, 2016

(65) Prior Publication Data

US 2017/0289203 A1 Oct. 5, 2017

(51) Int. Cl.
*H04L 12/16* (2006.01)
*H04L 29/06* (2006.01)
*H04W 4/14* (2009.01)

(52) U.S. Cl.
CPC ...... *H04L 65/1069* (2013.01); *H04L 65/1016* (2013.01); *H04L 65/1023* (2013.01); *H04L 65/1073* (2013.01); *H04W 4/14* (2013.01)

(58) Field of Classification Search
CPC ......... H04Q 2213/28; H04Q 2213/282; H04Q 2213/1307; H04Q 2213/13248; H04Q 2213/1328; H04Q 2213/13282; H04Q 2213/07
See application file for complete search history.

(56) References Cited

U.S. PATENT DOCUMENTS

| | | | |
|---|---|---|---|
| 8,725,820 B2 | 5/2014 | McNamee et al. | |
| 8,725,896 B2 | 5/2014 | McNamee et al. | |
| 8,824,370 B2 | 9/2014 | McNamee et al. | |
| 2008/0152123 A1* | 6/2008 | Pazhyannur | H04M 3/46 379/373.01 |
| 2010/0054220 A1* | 3/2010 | Bischinger | H04W 60/04 370/338 |
| 2011/0051701 A1* | 3/2011 | Cai | H04L 65/1016 370/338 |
| 2015/0350723 A1* | 12/2015 | He | H04L 12/6418 725/82 |

* cited by examiner

*Primary Examiner* — Alvin Zhu (57) ABSTRACT

A server, method, and non-transitory computer-readable medium for multi-endpoint design for IMS supported devices. The server includes a memory, a communication interface, and one or more processors operably connected to the memory and the communication interface. The one or more processors are configured to cause the communication interface to simultaneously transmit the incoming call to both (i) the primary device where IP multimedia subsystem (IMS) service is not supported based on user preference or operator policy and (ii) a secondary device, and transmit a message to the primary device to adaptively trigger IMS service for supporting multi-endpoint service.

17 Claims, 8 Drawing Sheets

MULTI-ENDPOINT DESIGN FOR EPDG SUPPORTED DEVICES

TECHNICAL FIELD

This disclosure relates generally to ePDG supported devices. More specifically, this disclosure relates to multi-endpoint design for ePDG supported devices.

BACKGROUND

Multi-End Point is a new service that extends communication services (voice, video and messaging) from a primary device to one or more secondary devices. To support multi-end point, both primary and secondary devices are required to be on internet protocol (IP) multimedia subsystem (IMS) services.

SUMMARY

This disclosure provides multi-endpoint design for ePDG supported devices.

In a first embodiment, a server is provided. The server includes a memory, communication interface, and one or more processors operably connected to the memory and the communication interface. The one or more processors are configured to simultaneously transmit the incoming call to both (i) the primary device where IP multimedia subsystem (IMS) service is not supported based on user preference or operator policy and (ii) a secondary device, and transmit a message to the primary device to trigger IMS service for supporting multi-endpoint service.

In a second embodiment, a method is provided. The method includes simultaneously transmitting the incoming call to both (i) the primary device where IP multimedia subsystem (IMS) service is not supported based on user preference or operator policy and (ii) a secondary device, and transmitting a message to the primary device to trigger IMS service for supporting multi-endpoint service.

In a third embodiment, a non-transitory computer-readable medium embodying a computer program is provided. The computer program comprising computer-readable program code that, when executed by one or more processors, causes a server to simultaneously transmit the incoming call to both (i) the primary device where IP multimedia subsystem (IMS) service is not supported based on user preference or operator policy and (ii) a secondary device, and transmit a message to the primary device to trigger IMS service for supporting multi-endpoint service.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Many operators are globally commercializing evolved packet data gateway (ePDG) services. Most of the deployment supports 2 modes, which are cellular preferred, where a cellular network is preferred over WiFi, and WiFi preferred, where WiFi is preferred over a cellular network. Some operators only support cellular preferred mode. Cellular preferred mode gives preference to 3G/2G (UMTS/GSM, 1×, etc) network over WiFi. One of the major disadvantages of this mode is that IMS services are not supported over 3G/2G for most operators. This creates a major challenge to support multi-endpoints services like call pulling, call notification, etc. as there is no standard for supporting this on 3G/2G CS network. Hence, an enhanced method will be needed for supporting multi-endpoint service when a user equipment (UE) is in cellular preferred mode.

Figure 1:
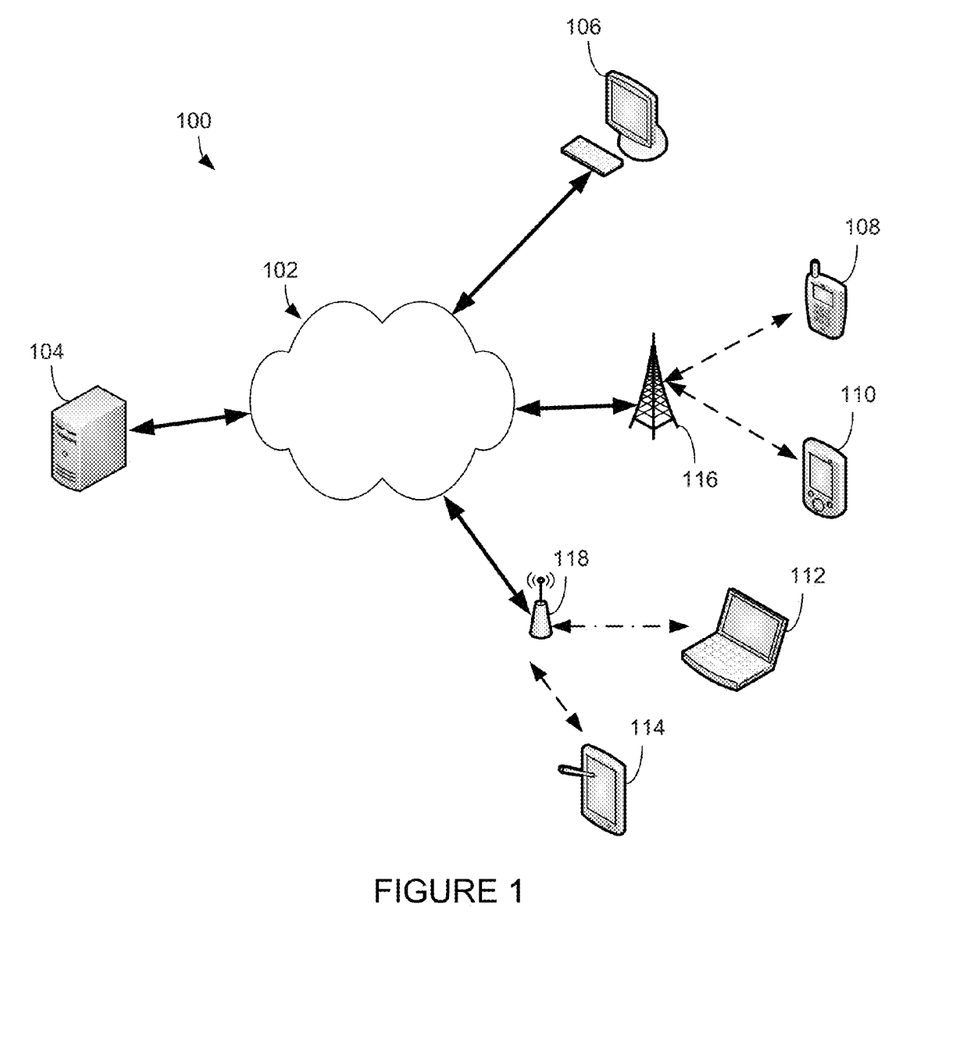
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices, including providing multi-endpoint services for ePDG supported devices. Each server 104 could, for example, include one or more processing devices, one or more memories storing instructions and data, and one or more network interfaces facilitating communication over the network 102 or simultaneously transmit an incoming call to multiple endpoint devices.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides for multi-endpoint services that extend communication services to one or more secondary devices. For example, server 104 may provide for operation of multi-endpoint services and simultaneously transmit an incoming call to multiple client devices 108-114.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
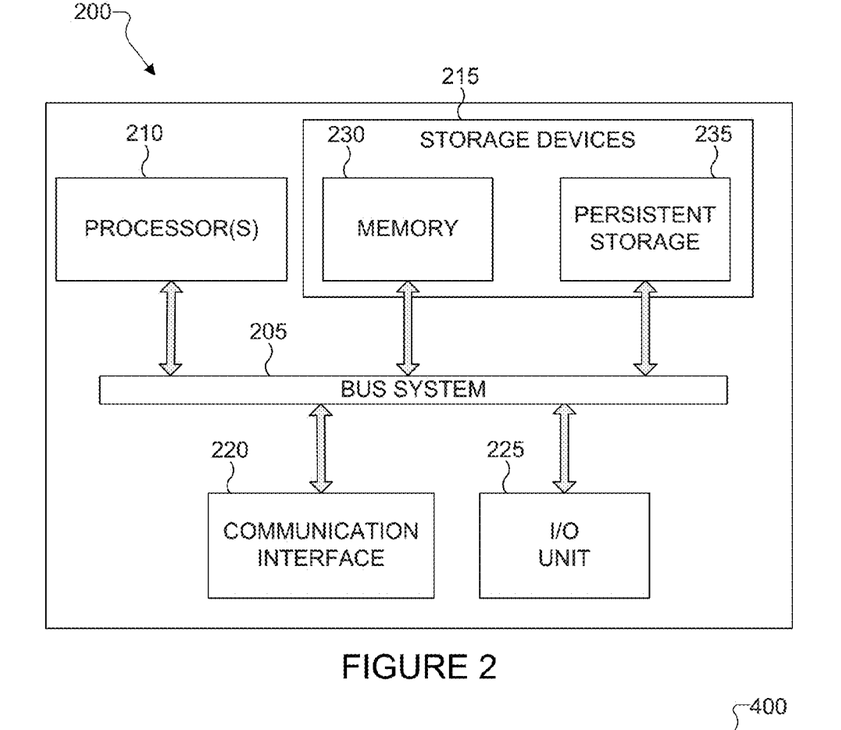
FIGS. 2 and 3 illustrate example devices in a computing system according to various embodiments of the present disclosure.
Figure 3:
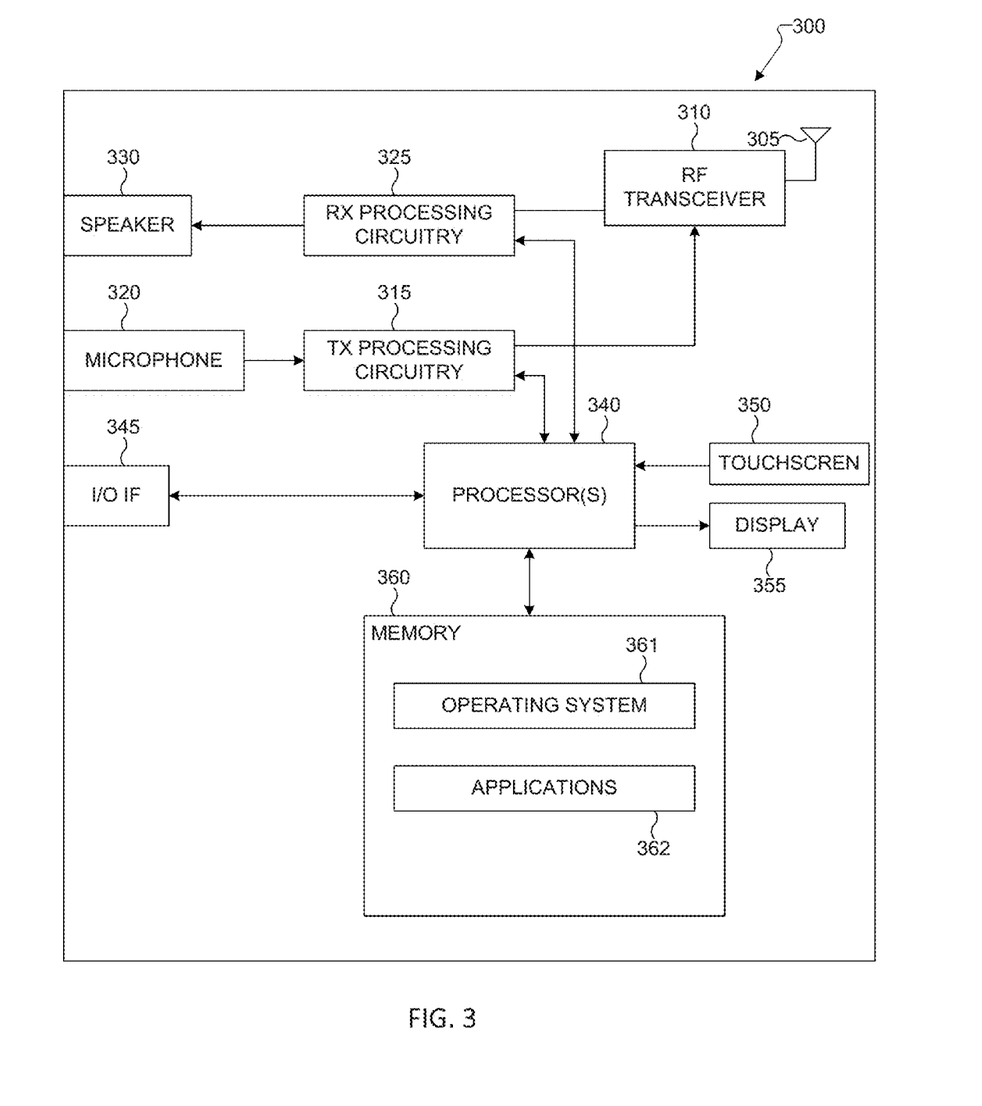

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between one or more processors 210, at least one storage device 215, at least one communication interface 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for multi-endpoint design for ePDG supported devices.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for providing multi-endpoint design services, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for multi endpoint design for ePDG supported devices. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 implements an apparatus that can initiate or receive an incoming call to or from server 104 over network 102. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
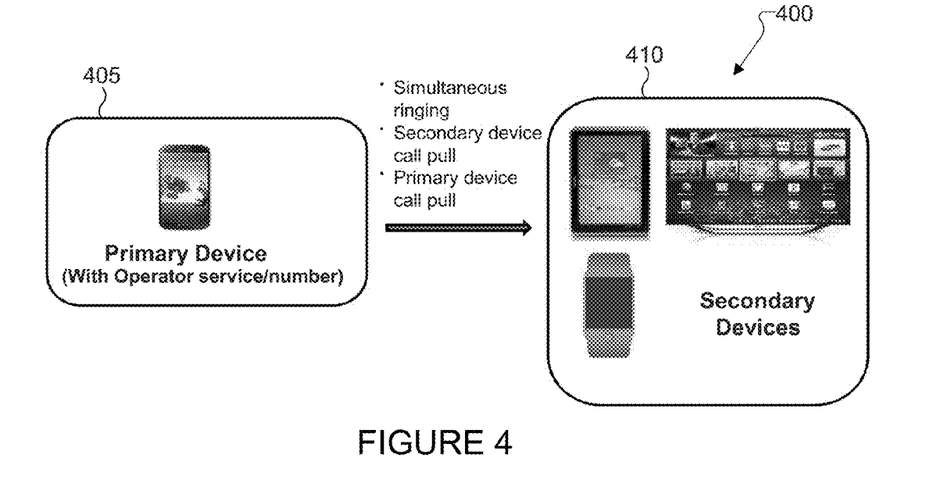
FIG. 4 illustrates an example flowchart for a multi-endpoint service according to various embodiments of the present disclosure.

FIG. 4 illustrates an example multi-endpoint service 400 according to various embodiments of the present disclosure.

Multi-endpoint 400 is a new service that extends communication services (voice, video and messaging) to one or more secondary devices 410. A primary device 405 is enabled with a service provider's voice/video service (e.g. has MDN, mobile directory number). One or more multi-endpoint devices associated with primary device 405 MDN act like secondary device 410. The secondary devices 410 need to support internet connection. Examples of secondary devices 410 include a tablet, a microphone & speaker, TVs, a smart watch, a connected car, etc. Multi-endpoint service supports simultaneous ringing. Both primary device 405 and secondary devices 410 can originate or receive calls. Incoming calls are alerted in the primary device 405 and secondary devices 410 simultaneously, and calls can be picked by either the primary device 405 or secondary devices 410.

Multi-endpoint service also supports call pulling. A secondary device 410 can pull the call when the call is answered in a primary device 405, or the primary device 405 will have option for user to pull the call from a secondary device 410 when call is answered in the secondary device 410. Support for multi-endpoint call pulling service 400 requires both the primary device 405 and secondary devices 410 to be on IMS services.

Figure 5:
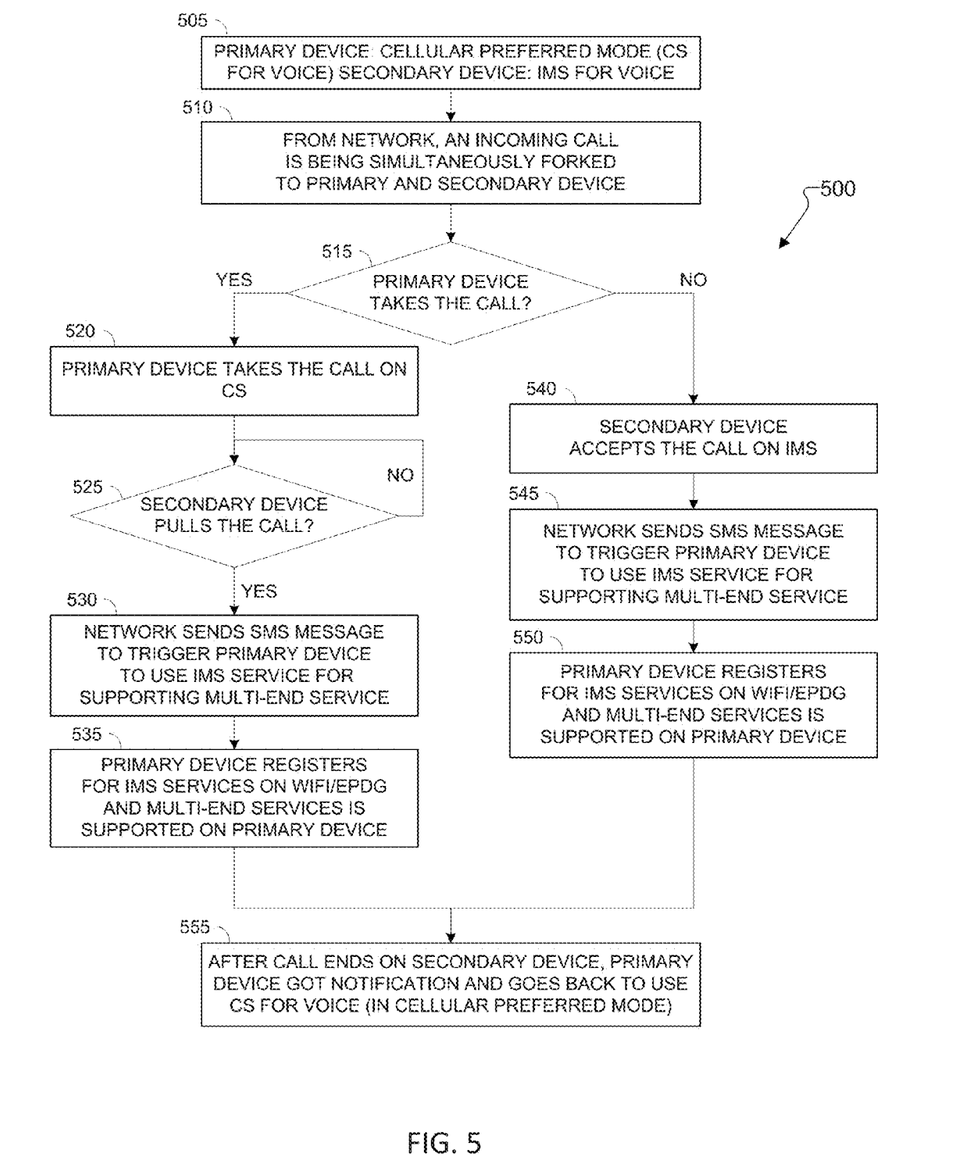
FIG. 5 illustrates an example flowchart for a multi-endpoint service for a cellular preferred mode primary device according to various embodiments of the present disclosure.

FIG. 5 illustrates an example flowchart for a multi-endpoint service for a cellular preferred mode primary device according to various embodiments of the present disclosure.

In operation 505, the primary device 405, for example, is a smartphone connected to a cellular service network, such as a 3G, 2G, or 1× network, and configured in cellular preferred mode. The secondary device 410 is internet connected and supports IMS based voice/video services.

In operation 510, an incoming call is being simultaneously forked to the primary and secondary device. The server 200 simultaneously transmits an indication of an incoming call to a primary device 405 and a secondary device 410. The server 200 can transmit the indication of the incoming call to the primary device 405 over the cellular network and the secondary device 410 over the internet. The indication causes the primary device 405 and the secondary device 410 to ring simultaneously.

In operation 515, the incoming call can be answered by either the primary device 405 or the secondary device 410.

In operation 520, the primary device takes the call on the CS. The server 200 transmits the incoming call to the primary device after the CS call setup is completed. When the primary device 405 takes the incoming call, an SIP cancel is sent to the secondary device 410 from server 200. The secondary device sends a SIP subscribe to the server 200 and receives call detail info from a SIP notify. The secondary device 410 includes a menu for pulling the incoming call using IMS services.

In operation 525, the secondary device pulls the call from primary device. The server 200 receives a SIP Invite from the secondary device when the user decides to pull the call on the secondary device. After call session is setup with secondary device 410, the server 200 sends CS call cancel message to the primary device 405 and the call is no longer transmitted to the primary device 405. The secondary device 410 now can communicate with the user of the incoming call.

In operation 530, the network sends an SMS message to trigger the primary device to use IMS service for supporting multi-end service. Once call session is setup with secondary device 410, the server 200 transmits a short message service (SMS) message to the primary device 405. The SMS message includes an action request to request the primary device to switch to use the IMS server for supporting multi-end services.

In operation 535, the primary device registers for IMS service on WiFi/ePDG and multi-end services is supported on primary device. The server 200 receives registration information for IMS service on the WiFi/ePDG for supporting multi-endpoint service 400 on the primary device 405. The primary device 405 subscribes for the call information. The server 200 transmits all the call details using SIP Notify and all the multi-endpoint service are supported, allowing the incoming call to be pulled from the secondary device 410.

In operation 540, the secondary device takes the call on IMS. The server 200 transmits the incoming call to the secondary device when the secondary device uses SIP protocol to accept the incoming call.

In operation 545, the network sends an SMS message to trigger the primary device to use IMS service for supporting multi-end service. Once the secondary device 410 takes the incoming call, the server 200 transmits a short message service (SMS) message to the primary device 405. The SMS message includes an action request to request the primary device to switch to use the IMS server for multi-end services.

In operation 550, the primary device registers for IMS service on WiFi/ePDG and multi-end services is supported on primary device. The server 200 receives registration information for IMS service on the WiFi/ePDG for supporting multi-endpoint service 400 on the primary device 405. The primary device 405 subscribes for the call information. The server 200 transmits all the call details using SIP Notify and all the multi-endpoint service are supported, allowing the incoming call to be pulled from the secondary device 410.

In operation 555, after the call ends on the secondary device, the primary device gets a notification and goes back to use CS for voice (in cellular preferred mode). The server 200 receives a SIP Bye ending the incoming call and notifies the primary device for call end via a SIP Notify. The primary device 405 receives the notification and reverts back to cellular preferred mode. The primary device 405 de-registers for IMS service and disconnects from the IMS over WiFi/ePDG.

Although FIG. 5 illustrates one example of a multi-endpoint service for a cellular preferred mode primary device, various changes may be made to FIG. 5. For example, while shown as a series of operations, various operations could overlap, occur in parallel, occur in a different order, or occur multiple times.

Figure 6A:
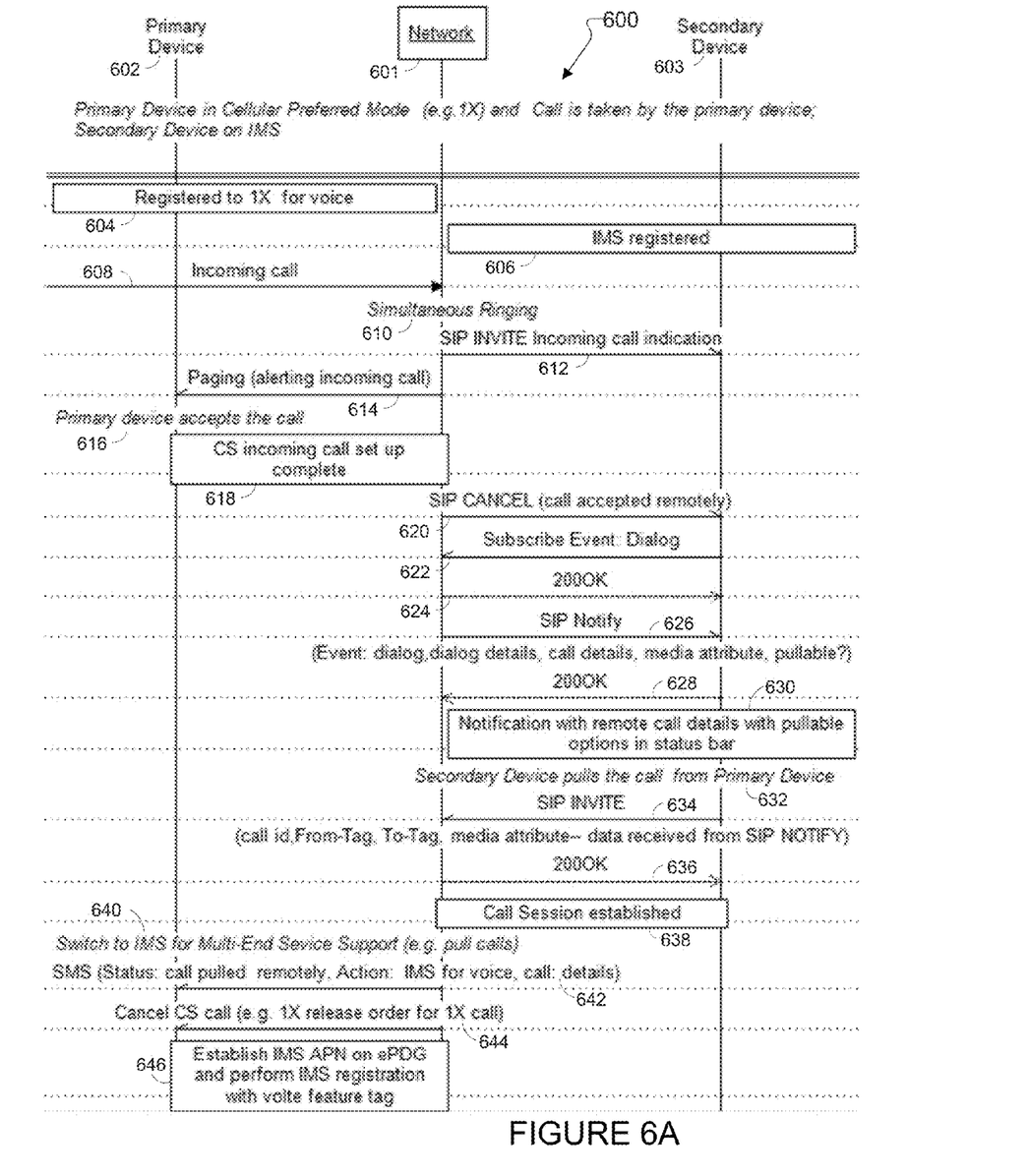
FIGS. 6A and 6B illustrate an example flowchart for a multi-endpoint service where a primary device takes the incoming call according to various embodiments of the present disclosure.
Figure 6B:
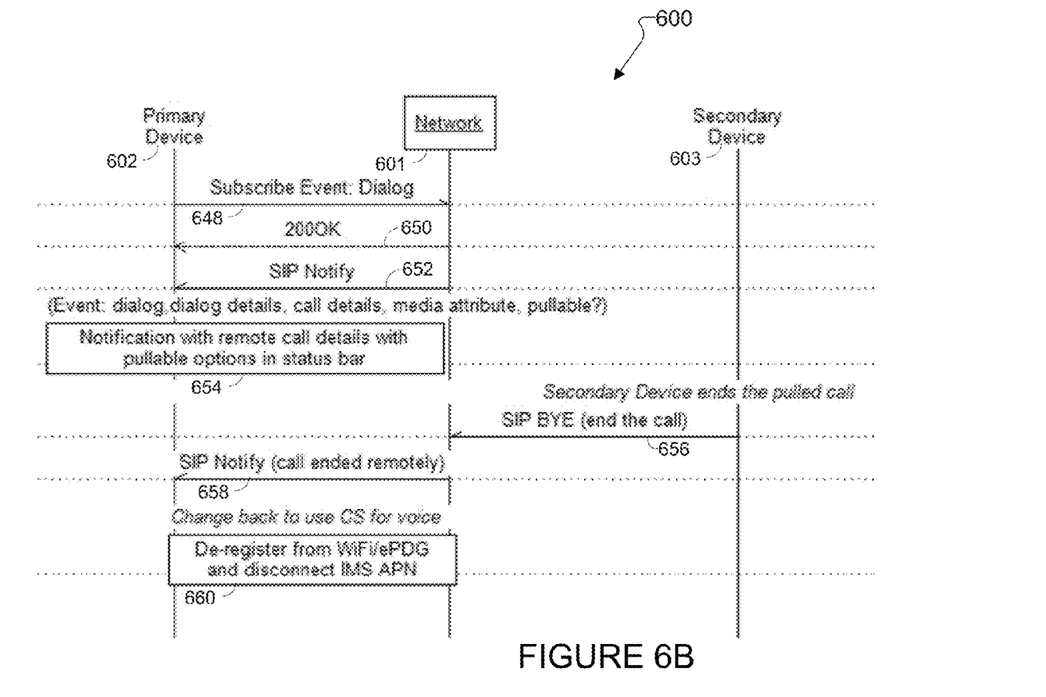

FIGS. 6A and 6B illustrate an example flowchart for a multi-endpoint service where a primary device takes the incoming call according to various embodiments of the present disclosure.

In operation 604, the primary device 602, for example, is a smartphone connected to a cellular service network, such as a 3G, 2G, or 1x network, and configured in cellular preferred mode. In operation 606, the secondary device 410 is internet connected and supports IMS based voice/video services.

In operation 608, the network 601 receives an incoming call. The incoming call can be transmitted using any method, such as cellular, voice over internet protocol, etc. In operation 610, the network 601 indicates to both the primary device 602 and the secondary device 603 of the incoming call and both devices simultaneously ring. To provide for simultaneous ringing, the network 601 transmits a SIP INVITE message to the secondary device 603 in operation 612 and a paging signal to the primary device 602 for alerting the primary device 602 of the incoming call in operation 614.

In operation 616, the primary device 602 accepts the phone call. In operation 618, the cellular service incoming call set up is completed.

In operation 620, the network 601 transmits a SIP cancel to the secondary device 603 indicating that the primary device 602 has answered the phone call. In operation 622, the secondary device 603 transmits a SIP subscribe event to the network 601, which the network responds with an acknowledge message in operation 624.

In operation 626, the network 601 transmits a SIP NOTIFY message with dialog, dialog details, call details, media attributes, call pulling status, etc. The secondary device acknowledges by transmitting a message to the network in operation 628. In operation 630, the using the details transmitted by the network 601 in operation 626, the secondary device 603 display a notification with remote call details including a call pull option in a status bar.

In operation 632, the secondary device 603 receives an indication from the display to pull the call from the primary device 602. In operation 634, the secondary device 603 transmits an SIP INVITE message to the server with the call id, From-Tag, To-Tag, media attributes from the data received in the SIP NOTIFY in operation 626. In operation 636, the network 601 transmits a message to the secondary device acknowledging receiving the SIP INVITE message. In operation 638, the call session is established between the network 601 and the secondary device 603.

In operation 640, once the call session is established with the secondary device 603, the primary device 602 is triggered to switch to IMS for multi-endpoint service support.

In operation 642, an SMS message is transmitted to the primary device 602 from the network 601 including the status of the call accepted remotely, an action request which requests the primary to switch to use IMS service for voice, and the details of the call. In operation 644, the network transmits a message that cancels the CS call between the network 601 and the primary device 602. In operation 646, IMS services are established between the network 601 and the primary device 602 on ePDG and the primary device 602 performs IMS registration with a volte feature tag.

In operation 648, the primary device 602 transmits an SIP subscribe event to the network 601, which the network responds with an acknowledge message in operation 650.

In operation 652, the network 601 transmits a SIP NOTIFY message with dialog, dialog details, call details, media attributes, call pulling status, etc. In operation 654, using the details transmitted by the network 601 in operation 652, the primary device 602 displays a notification with remote call details including a call pull option in a status bar.

In operation 656, the secondary device 603 ends the call and transmits a SIP BYE message to the network 601. In operation 658, the network 601 transmits a SIP NOTIFY message indicating that the call was ended remotely. In operation 660, the primary device 601 de-registers from the WiFi/ePDG and disconnects from the IMS services.

Although FIG. 6 illustrates one example of a multi-endpoint service where a primary device takes the incoming call, various changes may be made to FIGS. 6A and 6B. For example, while shown as a series of operations, various operations could overlap, occur in parallel, occur in a different order, or occur multiple times.

Figure 7:
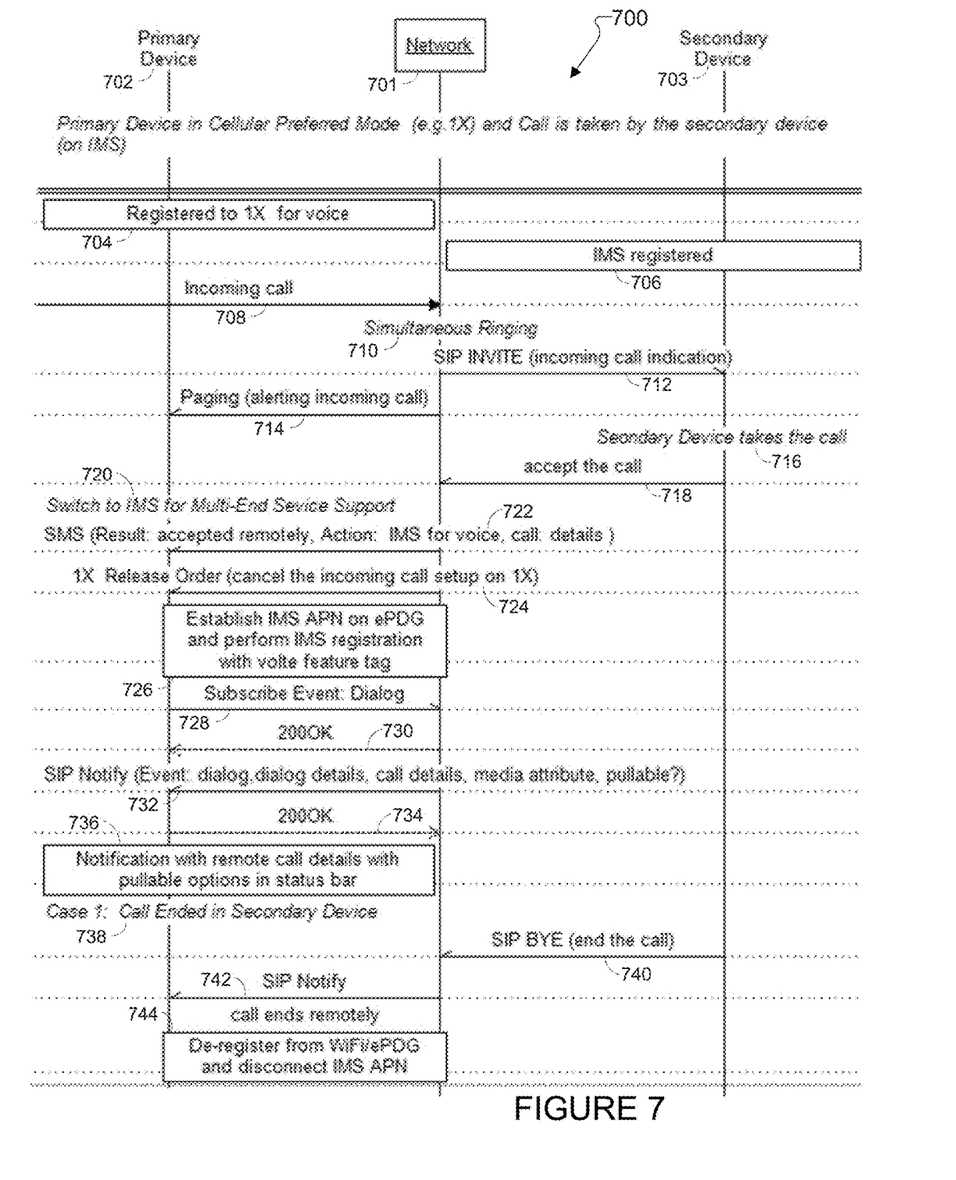
FIG. 7 illustrates an example flowchart for a multi-endpoint service where a secondary device takes and ends the incoming call according to various embodiments of the present disclosure.

FIG. 7 illustrates an example flowchart for a multi-endpoint service where a secondary device takes the incoming call and primary device in cellular preferred mode is triggered to switch to IMS service to support multi-end service according to various embodiments of the present disclosure.

In operation 704, the primary device 702, for example, is a smartphone connected to a cellular service network, such as a 3G, 2G, or 1× network, and configured in cellular preferred mode. In operation 706, the secondary device 410 is internet connected and supports IMS based voice/video services.

In operation 708, the network 701 receives an incoming call. The incoming call can be transmitted using any method, such as cellular, voice over internet protocol, etc. In operation 710, the network 701 indicates to both the primary device 702 and the secondary device 703 of the incoming call and both devices simultaneously ring. To provide for simultaneous ringing, the network 701 transmits a SIP INVITE message to the secondary device 703 in operation 712 and a paging signal to the primary device 702 for alerting the primary device 702 of the incoming call in operation 714.

In operation 716, the secondary device takes the call and transmits a message to the network 701 accepting the calling in operation 718.

In operation 722, once the call session is established with the secondary device 603, an SMS message is transmitted to the primary device 702 from the network 701 including the status of the call accepted remotely, an action request to request the primary device to switch to use IMS service for voice, and the details of the call. In operation 724, the network transmits a message that cancel the incoming call setup between the network 701 and the primary device 702. In operation 726, IMS services are established between the network 701 and the primary device 702 on ePDG and the primary device 702 performs IMS registration with a volte feature tag.

In operation 728, the primary device 702 transmits an SIP subscribe event to the network 701, which the network responds with an acknowledge message in operation 730.

In operation 732, the network 701 transmits a SIP NOTIFY message with dialog, dialog details, call details, media attributes, call pulling status, etc. In operation 734, the primary device 702 transmits a message acknowledging the SIP NOTIFY message has been received. In operation 736, using the details transmitted by the network 701 in operation 732, the primary device 702 displays a notification with remote call details including a call pull option in a status bar.

In operation 740, the secondary device 703 ends the call and transmits a SIP BYE message to the network 701. In operation 742, the network 701 transmits a SIP NOTIFY message indicating that the call was ended remotely. In operation 744, the primary device 701 de-registers from the WiFi/ePDG and disconnects from the IMS services.

Although FIG. 7 illustrates one example of a multi-endpoint service where a secondary device takes and ends the incoming call, various changes may be made to FIG. 7. For example, while shown as a series of operations, various operations could overlap, occur in parallel, occur in a different order, or occur multiple times.

Figure 8:
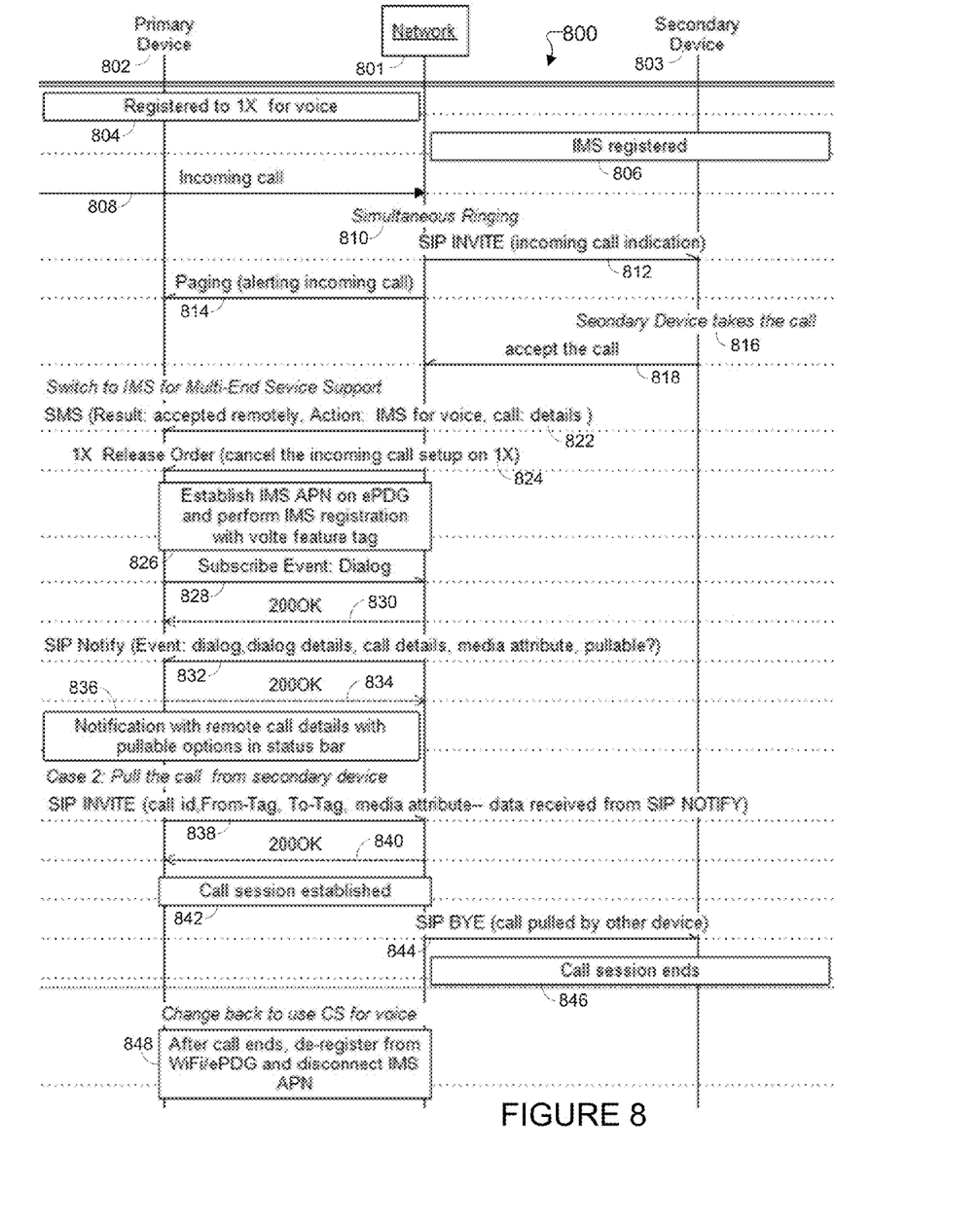
FIG. 8 illustrates an example flowchart for a multi-endpoint service where a secondary device takes and the primary device pulls the incoming call according to various embodiments of the present disclosure.

FIG. 8 illustrates an example flowchart for a multi-endpoint service where a secondary device takes an incoming call and the primary device in cellular preferred mode is triggered to switch to IMS service to support multi-end service and later on pulls the incoming call from the secondary device according to various embodiments of the present disclosure.

In operation 804, the primary device 802, for example, is a smartphone connected to a cellular service network, such as a 3G, 2G, or 1× network, and configured in cellular preferred mode. In operation 806, the secondary device 410 is internet connected and supports IMS based voice/video services.

In operation 808, the network 801 receives an incoming call. The incoming call can be transmitted using any method, such as cellular, voice over internet protocol, etc. In operation 810, the network 801 indicates to both the primary device 802 and the secondary device 803 of the incoming call and both devices simultaneously ring. To provide for simultaneous ringing, the network 801 transmits a SIP INVITE message to the secondary device 803 in operation 812 and a paging signal to the primary device 802 for alerting the primary device 802 of the incoming call in operation 814.

In operation 816, the secondary device takes the call and transmits a message to the network 801 accepting the calling in operation 818.

In operation 822, once the call session is established with the secondary device 603, an SMS message is transmitted to the primary device 802 from the network 801 including the status of the call accepted remotely, an action request to request the primary device to switch to use IMS for voice, and the details of the call. In operation 824, the network transmits a message that cancels the incoming call setup between the network 801 and the primary device 802. In operation 826, IMS services are established between the network 801 and the primary device 802 on ePDG and the primary device 802 performs IMS registration with a volte feature tag.

In operation 828, the primary device 802 transmits a SIP subscribe event to the network 801, which the network responds with an acknowledge message in operation 830.

In operation 832, the network 801 transmits a SIP NOTIFY message with dialog, dialog details, call details, media attributes, call pulling status, etc. In operation 834, the primary device 802 transmits a message acknowledging the SIP NOTIFY message has been received. In operation 836, the using the details transmitted by the network 801 in operation 832, the secondary device 803 display a notification with remote call details including a call pull option in a status bar.

In operation 838, the primary device 802 transmits an SIP INVITE message with the call id, from-tag, to-tag, and media attribute included in the data received in the SIP NOTIFY of operation 832 to pull the call from the secondary device 803. In operation 840, the network transmits a message acknowledging the SIP INVITE message was received. In operation 842, a call session is established for the incoming call between the primary device 802 and the network 801.

In operation 844, the network 801 transmits an SIP BYE message to the secondary device 803 indicating that the primary device 802 pulled the incoming call. In operation 846, the call session between the network 801 and the secondary device 803 is ended.

In operation 848, the primary device 802 ends the call. The primary device 802 de-registers from the WiFi/ePDG and disconnects from the IMS services. The primary device 802 returns to a cellular preferred mode.

Although FIG. 8 illustrates one example of a multi-endpoint service where a secondary device takes and the primary device pulls the incoming call, various changes may be made to FIG. 8. For example, while shown as a series of operations, various operations could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A server for supporting multiple endpoint services for a duration of an incoming call, the server comprising:
   a memory;
   a communication interface; and
   one or more processors operably connected to the memory and the communication interface, the one or more processors are configured to cause the communication interface to:
      simultaneously transmit the incoming call to both (i) a primary device where IP multimedia subsystem (IMS) service is not supported based on user preference or operator policy and (ii) a secondary device; and
      adaptively trigger the primary device to use IMS service for supporting multi-endpoint service in response to the secondary device taking the incoming call.

2. The server of claim 1, wherein to adaptively trigger the primary device comprises to transmit a short message service (SMS) message to the primary device to trigger registration for IMS service.

3. The server of claim 1, wherein the secondary device is registered for IMS services.

4. The server of claim 1, wherein the one or more processors are further configured to:
   connect the primary device, via the communication interface, when the primary device accepts the incoming call; and
   adaptively trigger the primary device to use IMS service for supporting multi-endpoint service in response to the secondary device pulling the incoming call.

5. The server of claim 1, wherein the one or more processors are further configured to receive, via the communication interface, registration information of the primary device for IMS services.

6. The server of claim 1, wherein the one or more processors are further configured to cause the communication interface to receive a message from the primary device to de-register the IMS service and return to being circuit switched (CS) for voice when the incoming call is ended.

7. A method for supporting multiple endpoint services for a duration of an incoming call, the method comprising:
   simultaneously transmitting the incoming call to both (i) a primary device where IP multimedia subsystem (IMS) service is not supported based on user preference or operator policy and (ii) a secondary device; and
   adaptively triggering the primary device to use IMS service for supporting multi-endpoint service in response to the secondary device taking the incoming call.

8. The method of claim 7, wherein adaptively triggering the primary device comprises transmitting a short message service (SMS) message to the primary device to trigger registration for IMS service.

9. The method of claim 7, wherein the secondary device is registered for IMS services.

10. The method of claim 7, further comprising:
    connecting the primary device when the primary device accepts the incoming call; and
    adaptively triggering the primary device to use IMS service for supporting multi-endpoint service in response to the secondary device pulling the incoming call.

11. The method of claim 7, further comprising receiving registration information of the primary device for IMS services.

12. The method of claim 7, further comprising receiving a message from the primary device to de-register the IMS service and return to being circuit switched (CS) for voice when the incoming call is ended.

13. A non-transitory computer-readable medium embodying a computer program, the computer program comprising computer-readable program code that, when executed by one or more processors, causes a server to:
    simultaneously transmit an incoming call to both (i) a primary device where IP multimedia subsystem (IMS) service is not supported based on user preference or operator policy and (ii) a secondary device; and
    adaptively trigger the primary device to use IMS service for supporting multi-endpoint service in response to the secondary device taking the incoming call.

14. The non-transitory computer-readable medium of claim 13, wherein to adaptively trigger the primary device comprises to transmit a short message service (SMS) message to the primary device to trigger registration for IMS service, and
   wherein the secondary device is registered for IMS services.

15. The non-transitory computer-readable medium of claim 13, further comprising computer-readable program code that, when executed, further causes the server to:
   connect the primary device when the primary device accepts the incoming call; and
   adaptively trigger the primary device to use IMS service for supporting multi-endpoint service in response to the secondary device pulling the incoming call.

16. The non-transitory computer-readable medium of claim 13, further comprising computer-readable program code that, when executed, further causes the server to receive registration information of the primary device for IMS services.

17. The non-transitory computer-readable medium of claim 13, further comprising computer-readable program code that, when executed, further causes the server to receive a message from the primary device to de-register the IMS service and return to being circuit switched (CS) for voice when the incoming call is ended.

* * * * *